United States Patent [19]

Seppä et al.

[11] Patent Number: 5,354,130

[45] Date of Patent: Oct. 11, 1994

[54] METHOD AND APPARATUS FOR MEASURING THE TEMPERATURE OF AN ELECTRICALLY CONDUCTIVE MATERIAL

[75] Inventors: Heikki Seppä; Lauri Holappa, both of Espoo, Finland

[73] Assignee: Valtion teknillinen tutkimuskeskus, Espoo, Finland

[21] Appl. No.: 917,116

[22] PCT Filed: Feb. 14, 1990

[86] PCT No.: PCT/FI90/00046

§ 371 Date: Jul. 30, 1992

§ 102(e) Date: Jul. 30, 1992

[87] PCT Pub. No.: WO91/12503

PCT Pub. Date: Aug. 22, 1991

[51] Int. Cl.$^5$ .............................................. G01K 7/30
[52] U.S. Cl. .................................... 374/175; 374/117
[58] Field of Search ............... 374/117, 120, 121, 163, 374/175, 176, 208

[56] References Cited

U.S. PATENT DOCUMENTS

| | | | |
|---|---|---|---|
| 3,486,023 | 12/1969 | McKeown | 374/117 |
| 3,848,466 | 11/1974 | Dial et al. | 374/163 |
| 3,878,723 | 4/1975 | Blalock et al. | 374/175 |
| 4,095,469 | 6/1978 | Yamada et al. | |
| 4,233,843 | 11/1980 | Thompson et al. | 374/117 |
| 4,246,784 | 1/1981 | Bowen | 374/117 |
| 4,627,744 | 12/1986 | Brixy et al. | 374/175 |
| 4,869,598 | 9/1989 | McDonald | 374/176 |
| 4,886,371 | 12/1989 | Fondin | 374/208 |

FOREIGN PATENT DOCUMENTS

| | | |
|---|---|---|
| 2256887 | 6/1973 | Fed. Rep. of Germany . |
| 8604315-5 | of 0000 | Sweden . |
| 1360940 | 6/1974 | United Kingdom . |
| 1425013 | 2/1976 | United Kingdom . |
| 1443407 | 7/1976 | United Kingdom . |

*Primary Examiner*—William A. Cuchlinski, Jr.
*Assistant Examiner*—G. Bradley Bennett
*Attorney, Agent, or Firm*—Merchant & Gould, Smith, Edell, Welter & Schmidt

[57] ABSTRACT

The invention concerns a method and an apparatus for measuring the temperature of an electrically conductive material, said method being based on the measurement of the thermal noise of the material. In the method, the fluctuation of the magnetic field generated by the random motion of the charge carriers in the conductive material is measured using a resonant circuit (3) without contact with the material (1) under measurement. The apparatus comprises a sensor (5) provided with a resonant circuit (3), the reactance element of which is placed at a distance (s) from the material (1) whose temperature is to be measured, and a preamplifier (2), said sensor (5) being mounted inside a frame (20) made of a conductive material, such as copper.

2 Claims, 3 Drawing Sheets

METHOD AND APPARATUS FOR MEASURING THE TEMPERATURE OF AN ELECTRICALLY CONDUCTIVE MATERIAL

The present invention relates to a method for measuring the temperature of an electrically conductive material as defined in the introductory part of the claim annexed. The invention also relates to an apparatus for implementing the method. The method and apparatus allow the temperature of a hot, solid or molten conductive material to be measured without a contact between the measuring sensor and the object under measurement.

High temperatures of several hundreds or thousands of degrees (° C.) are mainly measured using a pyrometer or a thermoelement. The former is based on the measurement of the thermal radiation emitted by the object, the latter on the thermoelectric effect.

The radiation pyrometer is a device for contactless temperature measurement. It is capable of measuring the temperature from a fairly long distance from the object. A drawback with the radiation pyrometer (e.g. in measurements in the metallurgic industry) is the fact that the emissivity of the radiating object depends, in addition to its temperature, also on the radiating material. Therefore, e.g. in the measurement of the temperature of a metal surface, an oxidic recrement layer on the surface or a layer of slag on the surface of molten metal may cause significant errors that are difficult to compensate. Similarly, smoke, dust, water vapour etc. cause errors.

The thermoelement is commonly used especially for measuring the temperature of molten metals. This device is used for direct measurement, i.e. the thermoelement is sunk into the object under measurement. The problem is the aggressivity of the circumstances. The sensors used for the measurements are generally of a disposable design and the measurements therefore relate to specific points in the objects. For continuous measurements, it is necessary to use protective tubes, and these retard the transmission of heat, increasing the measuring time lag of the element.

For practical reasons, the thermoelement is difficult to use for measuring the temperature of moving hot objects, e.g. casting or rolling blooms. Therefore, thermoelements attached to the object surface have only been used for research purposes.

It is known that the noise in a thermally balanced electric circuit is directly proportional to the temperature. A general formulation of this law is given in the dissipation theorem, which, when applied to an electric resistance, yields the so-called Nyquist theorem. A device for measuring noise temperature based on this theorem has been constructed. Using this device, the temperature can be realized by using the Bolzmann constant. This principle has been employed for accurate measurements of both low and very high temperatures. In these measurements, the noise is measured from a resistor thermally anchored on the object under measurement. However, the use of this method and device for temperature measurements on hot and particularly moving objects is prevented by the fact that the connecting leads, contacts and the resistor itself are destroyed in high temperatures.

The object of the present invention is to produce a new and improved method and apparatus for measuring the temperature of electrically conductive materials, allowing contactless measurement of the temperature of a body or an object. As for the features characteristic of the invention, reference is made to claim annexed regarding the method, and to claim annexed regarding the apparatus.

The method of the invention is based on the measurement of thermal noise using a resonant circuit without contact with the material under measurement, especially a hot object. In this method, the fluctuation of the magnetic field generated by the random motion of the charge carriers in a metal or other conductive material is measured from a distance from the surface of the material.

The method and apparatus of the invention have the following advantages. The measurement can be performed without contact with the object under measurement. Insulating materials, e.g. air, dust, water vapour and other impurities, will not disturb the measurement significantly. Therefore, the method and the apparatus are especially applicable in industrial measurements, e.g. for the measurement of the temperature of hot casting and rolling blooms. Continuous temperature measurement on moving blooms is also possible. The method also permits the measurement of the temperature of molten metals through an insulating layer of facing material. In closely controlled laboratory conditions, the measurement can be performed with a very high accuracy, so that the method can be used to obtain reference temperatures for the calibration of thermoelements or pyrometers.

In the following, the invention is described in detail by referring to the appended drawings, in which FIG. 1 shows a block diagram representing an embodiment of the apparatus of the invention;

On the basis of the Nyquist theorem, an electric resistor in a state of thermal balance relative to its environment can supply a noise energy of $k_B T$ per band unit into a resistor at the absolute zero temperature. This applies to low frequencies only, because at high frequencies the thermal energy is discharged into the environment in the form of quanta and the power transfer per band unit becomes frequency-dependent. This phenomenon only occurs at very high frequencies, so that, as far as the method and apparatus of the invention are concerned, the power is evenly distributed over different frequencies. Put simply, the Nyquist theorem means that every electric loss is associated with a thermal noise voltage, the magnitude of which depends on the temperature T, the magnitude of the resistance R and the width $B_N$ of the noise band associated with the measurement. Correspondingly, the generation of the noise can be described as an equivalent current generator connected in parallel with the resistance. In other words $$<e_n^2> = 4k_B T B_N R \quad (1)$$

$$<i_n^2> = 4k_B T B_N / R \quad (2)$$

where $k_B$ is the Bolzmann constant ($1.38 \times 10^{-23}$ W/K). When the energy associated with the quantum hf (h being the Planck constant and f the quantum frequency) approaches the thermal energy $k_BT$, equations (1) and (2) are no longer valid.

Figure 1:
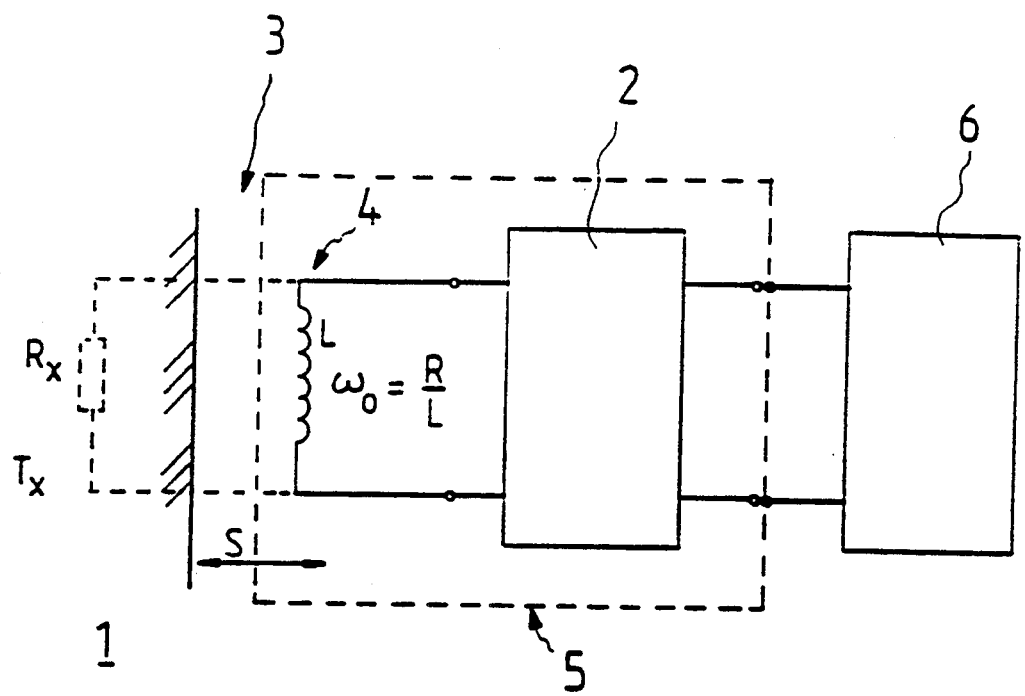
Figure 2:
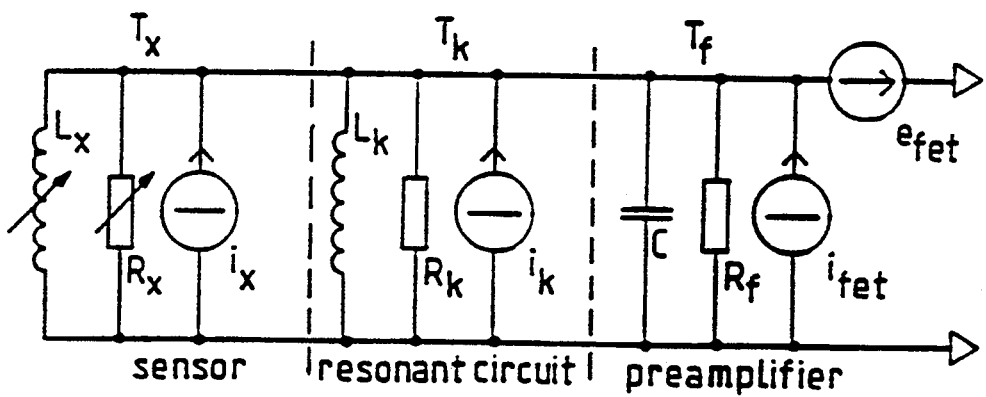
FIG. 2 represents the noise model of the apparatus of FIG. 1.

In the apparatus of the invention in FIGS. 1 and 2, the losses of the object 1 under measurement are applied to the input of the amplifier 2 through a partially open resonant circuit 3. In this case, the resonant circuit 3 uses a coil 4. The inductance of the resonant circuit is $L_k$, and its wasteful resistances are reduced to a parallel resistance $R_k$ and a corresponding noise current generator $i_k$. The parallel resistance $R_x$ represents the equivalent losses of the object 1 under measurement in the resonant circuit 3, and $i_x$ the current noise resulting from the losses. Since the conductive object 1 also influences the distribution of the external field, the resonant circuit inductance L depends on the distance s between the coil 4 and the object 1. By using static protectors the inductance of the coil 4 can be regarded as only changing, consisting of a constant part $L_k$, and the change in the resonant frequency $f_o$ ($\omega_o$) is represented by a variable inductance $L_x$. The amplifier noise in FIG. 2 is represented by current and voltage noise generators $i_{fet}$ and $e_{fet}$, respectively, connected to the output. The load capacity of the amplifier is represented by a resistance $R_f$. The temperatures $T_x$, $T_k$ and $T_f$ represent the temperature of the object under measurement, the coil noise temperature and the amplifier noise temperature, respectively. All capacitances of the circuit are included in the capacitor C, which is assumed to be independent of the distance s between the object 1 and the sensor 5, which in its simplest form consists of a coil 4 and an amplifier 5. It is to be noted that the effects of other losses in the coil 4 have not been considered in the model.

After the amplifier 2, the noise can be detected by means of a suitable detector or measuring unit 6 either directly or by mixing the noise with low frequencies and detecting it by means of a suitable detector circuit.

Figure 4:
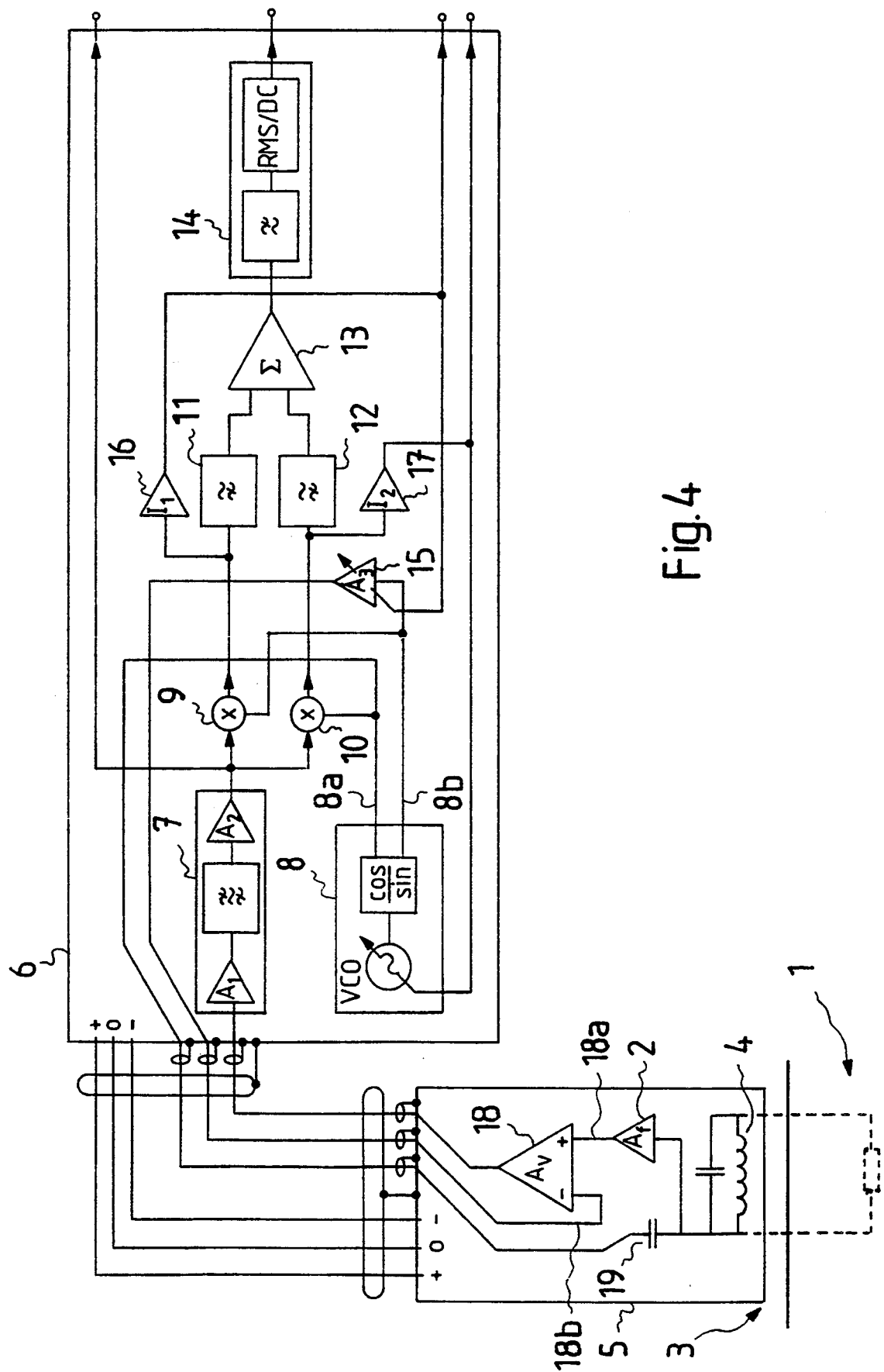
FIG. 4 shows a block diagram representing another embodiment of the apparatus of the invention together with a measuring unit.

In an embodiment of the method and apparatus of the invention, the noise is mixed down with a frequency corresponding to the resonant frequency $\omega_o = 1/\sqrt{(LC)}$ of the resonant circuit 3. FIG. 4 illustrates such an apparatus. The measurement unit 6, which corresponds to the detector unit 6 in FIG. 1, comprises a high-pass filter 7, a voltage-controlled oscillator 8, two mixers 9 and 10, high-pass filters 11 and 12, an adder 13, a r.m.s converter 14, a voltage amplifier 15 and current amplifiers or integrators 16 and 17. In addition, the sensor 5 is provided with a summing amplifier 18 and, if required, a coupling capacitor 19.

In the measurement circuit 6, high-pass filter 7 is connected to mixers 9 and 10. The output terminals 8a and 8b of the voltage-controlled oscillator 8, providing cosine and sine signals respectively, are connected to mixers 10 and 9, respectively. The outputs of the mixers 9, 10 are connected to high-pass filters 11, 12, and the outputs of these are connected to the inputs of the adder 13, whose output is connected to the r.m.s converter 14, whose output provides the measurement signal $U_{rms}$. Output 8b of the voltage-controlled oscillator 8 is connected via amplifier 15 to the second input 18b of the summing amplifier 18. Output 8a of the voltage-controlled oscillator 8 is connected via the coupling capacitor 19 to the input of the amplifier 2 in the sensor 5. The output of amplifier 2 is connected to the first input 18a of the summing amplifier 18. The output of mixer 9 is connected via current amplifier 16 to the second input of amplifier 15, allowing control of the gain. The output of mixer 10 is connected via current amplifier 17 to the input of the voltage-controlled oscillator 8.

In the apparatus illustrated by FIG. 4, the measured noise is mixed down with a frequency corresponding to the resonant frequency $\omega_o = 2\pi f_o$ of the resonant circuit 3. Due to interference, the mixed signal has to be filtered with a high-pass filter 7 with a response of $H_m(j\omega)$. Taking the resonant circuit response and the filter 11,12 after the mixer 9,10 into account, the variance of the output voltage can be expressed as $$<U_o^2> = \frac{2k_B T_e R}{\pi_o} \int^\infty \left[\left[1 + \frac{\omega_c^2}{\omega^2}\left[1 - \left(\frac{\omega}{\omega_o}\right)^2\right]^{-2} + \tfrac{1}{2}\frac{RT_f}{R_{fo}T_e}\right]|H_m(j(\omega - \omega_o))|^2 d\omega \quad (3)$$

where the equivalent temperature $T_e$ of the resonant circuit can be expressed using the component temperatures as follows:

$$T_e = R\left(\frac{T_x}{R_x} + \frac{T_k}{R_k} + \tfrac{1}{2}\frac{T_f}{R_{fo}}\right) \quad (4)$$

The load resistance R of the resonant circuit is obtained from the equation $$R^{-1} = (1/R_x + 1/R_k + 1/R_f) \quad (5)$$

In equation (3), $\omega_o$ is the natural frequency R/L of the coil. The noise temperature of the amplifier is $T_f$ for an optimal input impedance $R_{fo}$. Both $T_f$ and $R_{fo}$ are constants characteristic of the amplifier.

When the resonant frequency $\omega_o$ and total impedance R of the resonant circuit 3 are measured, the temperature $T_x$ of the object 1 can be determined unambiguously from equations (3)–(5).

If the coupling to the object 1 is very good $R \approx R_x$, then $T_e \approx T_x$. If it is additionally assumed that the amplifier has a low noise temperature, i.e. $T_f < < T_x$, and that the bandwidth of the high-pass filters 11,12 after the mixers 9,10 is clearly larger than that of the resonant circuit 3, then equation (3) will be reduced to the following simple form $$<U_o^2> = A^2 k_B T_x / C \quad (6)$$

where A is the overall gain before detection and C is the capacitance of the resonant circuit. It can be shown that better results are achieved if a filter bandwidth $H_m(j\omega)$ close to the resonant circuit bandwidth is selected, which means in practice that it is necessary to measure the impedance R and resonant frequency $\omega_o$ of the resonant circuit and to calculate $T_x$ on the basis of these results.

The essential point about the equations presented above is that the detected voltage $<U^2>$ is an unambiguous function $<U_o^2> = f(T_x, R, \omega_o)$ of the object temperature $T_x$ and the loaded impedance R and resonant frequency $\omega_o$ of the coil 4; in other words, object temperature $T_x = g (<U_o^2>, R, \omega_o)$. Correction can be effected either by using equations (3) and (5) or by measuring the output voltage for different temperatures and from different distances and applying the results to a suitable mathematical model.

The object temperature $T_x$ is determined by measuring the variance of the amplified voltage. The variance (inaccuracy of the temperature measurement) of the measured variance $\sigma^2$ depends on the measuring time and the equivalent noise bandwidth $B_e$ in accordance with the following equation:

$$Var[\sigma] = \frac{\sigma^2}{B_e \tau} \quad (7)$$

Thus, the relative resolution of the temperature measurement is $\epsilon = \Delta T/T = (B_e \tau)^{-\frac{1}{2}}$. If the resonant circuit is tuned to a frequency of about 1 MHz, then it is possible to achieve a 100 kHz noise band, so that a 10-second measuring time leads to a resolution of $10^{-3}$. The final impedance is determined from the inaccuracy of the impedance measurement, the changes in the noise temperatures of the amplifier and the open coil and from possible interference.

In the apparatus shown in FIG. 4, the resonant circuit 3 receives a current via capacitance 19 from output 8a of the voltage-controlled oscillator 8, and a voltage from output 8b via the variable amplifier 15. When the resonant circuit is purely real, the output signal of the summing amplifier 18 has a phase shift of 90° relative to the cosine signal at the oscillator output 8a, and thus the phase detector 10 output becomes zero and the output of the integrator 17 controlling the voltage-controlled oscillator remains unchanged. If the voltage induced in the resonant circuit by the current supplied through output 8a of the voltage-controlled oscillator does not cancel the voltage added to it in the summing amplifier 18, then the output of phase detector 9 will not become zero either, and thus the output of the integrator 16 controlling the gain of amplifier 15 will change until balance is reached. The outputs of both integrators 16, 17 will only become zero when the resonant circuit 3 is fed with a resonant-frequency signal and if the voltage fed into amplifier 18 cancels the voltage obtained from the resonant circuit. Thus, the output of integrator 16 becomes proportional to the real part R of the resonant-circuit impedance during resonance, whereas the output of integrator 15 becomes directly proportional to the resonant frequency $\omega_o$. After the mixers, the signals associated with the measurement of the impedance R and resonant frequency $\omega_o$ have a low frequency and they have been filtered by the high-pass filters 11 and 12. The noise signals obtained after these filters from both mixers are proportional to the temperature $T_x$ of the object under measurement. The signals are summed by the summing amplifier 13, and the root-mean-square value $U_{rms}$ of the noise is detected by the r.m.s. converter 14.

If necessary, the measuring unit 6 can be provided with one or more absorbing circuits tuned to radio transmitter frequencies close to the resonant frequency. In this way it is possible to avoid the interference caused by these radio stations.

The detected voltage U obtained from the measuring unit 6 can be transferred via an A/D converter to a data processing unit, such as a microcomputer, and used e.g. for process control or supervision.

Figure 3:
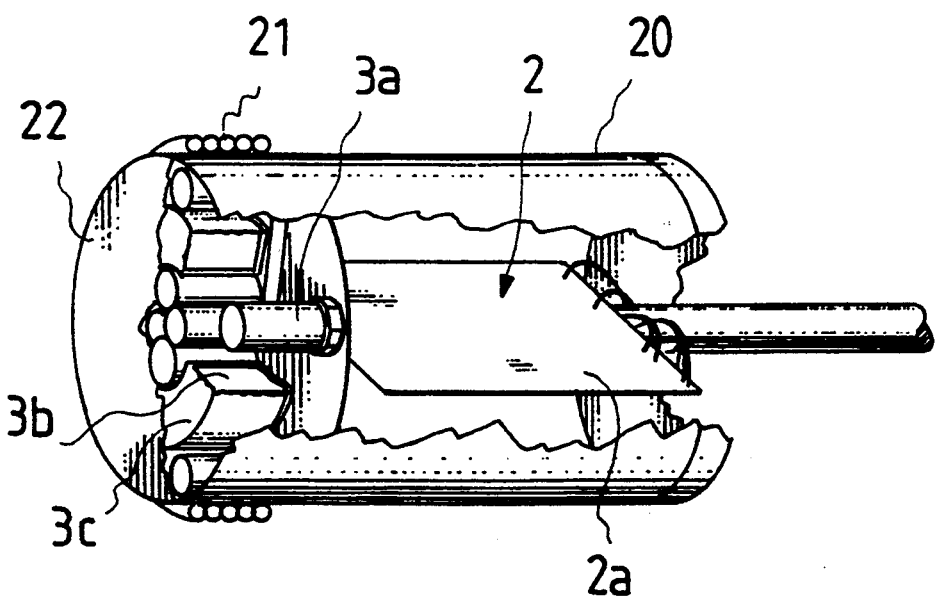
FIG. 3 shows a perspective view of an embodiment of the apparatus of the invention, partially sectioned.

FIG. 3 illustrates an embodiment of the apparatus of the invention, especially the sensor 5, in perspective and partly sectioned. The sensor 5 comprises a coil 4, in this case a winding 3b provided with a ferrite core 3a and fitted inside a frame 3c made of a suitable material, e.g. teflon. The coil 4 is placed at distance s from the material whose temperature $T_x$ is to be measured, as described above. Moreover, the sensor comprises a preamplifier 2 and possibly a mixer amplifier 18 (FIG. 4). The preamplifier 2 is built on a circuit board 2a placed in the immediate vicinity of the coil 4. The sensor is mounted inside a static screening, in this case a frame 20 made of a conductive material, such as copper.

The frame 20 is provided with a cooling means 21, which preferably consists of a tubular element wound in a spiral around that end of the frame 20 where the coil 3 is located. A suitable coolant is circulated through the cooling means during measurement.

The frame 20 is provided with a shield plate 22 or equivalent placed between the coil 4 and the material under measurement. The shield is made of a heat-resistant and neutral material, e.g. sapphire. In principle, the coil 4 of the sensor 5 is so designed as to make it as insensitive as possible to homogeneous magnetic fields, so that it will only sense the magnetic field fluctuations occurring on the surface of the object under measurement.

Figure 5:
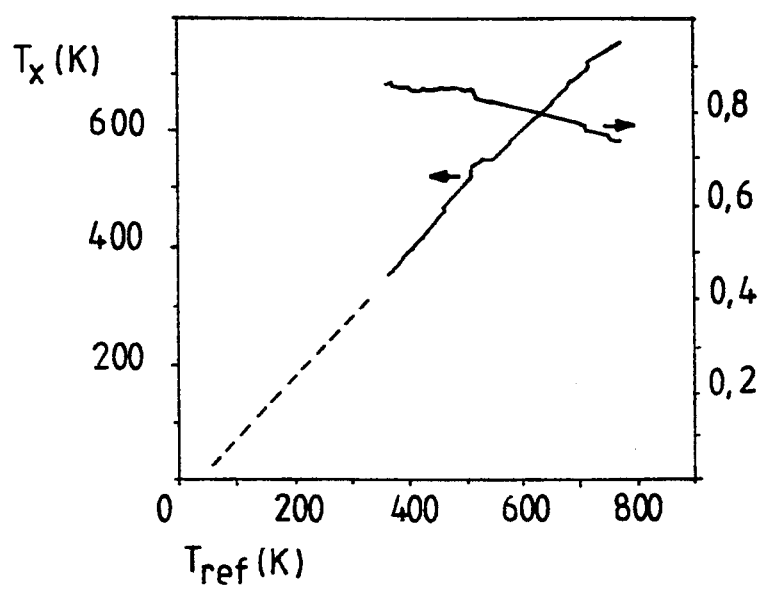
FIG. 5 illustrates the results obtained with the apparatus of the invention in experimental measurements on a steel object.

FIG. 5 shows a graph representing the output $U_o$ of the r.m.s. converter 14 when measuring the temperature of a steel object being heated. The left-hand vertical axis of the graph represents the square $<U_o^2>$ of the r.m.s. value of the noise voltage, representing the measured temperature (K) in accordance with formula (3). The right-hand vertical axis represents the impedance of the coil 4 at the resonant frequency. The horizontal axis represents the temperature (K) of the steel object. The results presented have been normalized by multiplying them with a constant. The r.m.s. value of the noise is linearly dependent on the temperature of the steel object. Therefore, the temperature has been obtained in these measurements by using the formula $T_x = U_o^2/R + B$, where A and B are constants. It can be concluded from the measurement results that the square $<U_o^2>$ of the r.m.s. value of the noise voltage follows the surface temperature $T_x$ of steel quite well. The accuracy of the apparatus can be further improved by increasing the measuring bandwidth, which can be achieved by increasing the resonant frequency. At high frequencies, the amplifier noise temperature can be reduced by cooling the preamplifier as well.

The apparatus of the invention for measuring surface temperatures can be so realized that the measuring accuracy is below ±3K. A very high accuracy will be achieved by replacing the copper winding of the coil 4 with a superconductor winding, preferably made of ceramic materials. Superconductor windings made of ceramic materials are already usable at the temperature (+77° K.) of liquid nitrogen.

In the above description, the reactance in the resonant circuit 3 consists of an inductance, but it is obvious that this can as well be replaced with a capacitance. In this case, the impedance of the object under measurement is adapted to a level suited for a low-noise preamplifier by means of a capacitance tuned into resonance, e.g. a capacitor, instead of an inductance, e.g. a coil. The measurement is performed fully analogously with the method described above.

In the above, the invention has been described by referring to one of its preferred embodiments, but it is obvious that it can be varied in many ways within the scope of the idea of the invention as defined in the following claims.

We claim:

1. Method for measuring the temperature of an electrically conductive material, based on the measurement of the thermal noise of the material, characterized in that the fluctuation of the magnetic field generated by the random motion of the charge carriers in the conductive material is measured using a resonant circuit (3) without contact with the material (1) under measurement;

wherein the measured high-frequency noise is mixed down with low frequencies and detected;

wherein the mixed noise signal ($<U^2>$) is detected, the resonant frequency ($\omega_o$) and impedance of the resonant circuit (3) are measured and the temperature ($T_x$) of the object under measurement is calculated from these results;

wherein the impedance of the resonant circuit (3) is measured by supplying the circuit with a current (I) and a voltage (U) of inverted phase relative to the current, that the frequency and the current amplitude are so adjusted that the signals generated by the current and voltage will cancel each other, so that in the balanced state the resonant frequency ($\omega_o$) is obtained directly from the frequency and the voltage/current ratio (U/I) is directly proportional to the impedance of the resonant circuit (3).

2. Apparatus for measuring the temperature of an electrically conductive material, the temperature being determined from thermal noise measured by the apparatus, characterized in that the apparatus comprises a sensor (5) provided with a resonant circuit (3), the reactance element of which is placed at a distance (s) from the material (1) whose temperature is to be measured;

a preamplifier (2);

said sensor (5) being mounted inside a frame (20) made of an electrically conductive material, such as copper;

wherein the reactance element is a coil (3) consisting of a superconductor winding, preferably made of a ceramic superconductor;

wherein the apparatus additionally comprises a measuring unit (6) including at least a mixer (9, 10) and a detector circuit (14), by means of which the measured noise is mixed down with low frequencies; and wherein the apparatus additionally comprises a summing amplifier (18) fitted in the sensor (5), and in the measuring unit (6) a high-pass filter (7) a voltage-controlled oscillator (8) with outputs (8a, 8b) for cosine and sine signals, two mixers (8, 9), high-pass filters (11, 12), and adder (13), a r.m.s. converted (14), a voltage amplifier (15) and two integrators (16, 17), said high-pass filter (7) being connected to the mixers (9, 10), the outputs (8a, 8b) of the voltage-controlled oscillator (8) to the mixers (9, 10) respectively, the outputs of the mixers (9, 10) to the high-pass filters (11, 12) and the outputs of the high-pass filters (11, 12) to the inputs of the adder (13), the output of which is connected to the r.m.s. converter, whose output provides a measurement signal ($U_{rms}$) proportional to the temperature of the object under measurement, and in which apparatus the output (8b) of the voltage-controlled oscillator (8) is connected via amplifier (15) to the second input (18b) of the summing amplifier (18), the output (8a) of the voltage-controlled oscillator (8) is connected (19) to the input of the amplifier (2) in the sensor (5) and the output of amplifier (2) is connected to the first input (18a) of the summing amplifier (18), and in which the output of mixer (9) is connected via current amplifier (16) to the second input of amplifier (15) and the output of mixer (10) is connected via current amplifier (17) to the input of the voltage-controlled oscillator (8).

* * * * *